United States Patent [19]

Mestemaker et al.

[11] Patent Number: 5,149,342

[45] Date of Patent: Sep. 22, 1992

[54] SYSTEM FOR RECOVERING SOLVENTS AND DISPOSING OF CONTAMINANTS RELEASED BY REGENERATION OF SOLVENT LADEN AIR ADSORBER VESSELS

[75] Inventors: Jerald L. Mestemaker; Clyde G. Anderson, both of Vero Beach, Fla.

[73] Assignee: Calgon Carbon Corporation, Pittsburgh, Pa.

[21] Appl. No.: 686,669

[22] Filed: Apr. 17, 1991

[51] Int. Cl.$^5$ .............................................. B01D 53/04
[52] U.S. Cl. ............................................ 55/59; 55/74
[58] Field of Search ................................... 55/59–62, 55/68, 74

[56] References Cited

U.S. PATENT DOCUMENTS

| | | | |
|---|---|---|---|
| 3,455,089 | 7/1969 | Mattia | 55/62 |
| 4,289,505 | 9/1981 | Hardison et al. | 55/59 |
| 4,409,006 | 10/1983 | Mattia | 55/60 X |
| 4,414,003 | 11/1983 | Blaudszun | 55/59 X |
| 4,421,532 | 12/1983 | Sacchetti et al. | 55/62 X |
| 4,589,890 | 5/1986 | Gronvaldt | 55/59 |
| 4,689,054 | 8/1987 | Vara et al. | 55/62 X |
| 4,859,216 | 8/1989 | Fritsch | 55/62 X |
| 4,902,310 | 2/1990 | Vara et al. | 55/59 X |
| 4,919,692 | 4/1990 | Vara et al. | 55/59 |
| 5,015,365 | 5/1991 | Vara et al. | 55/61 X |

FOREIGN PATENT DOCUMENTS

| | | | |
|---|---|---|---|
| 2703737 | 8/1978 | Fed. Rep. of Germany | 55/59 |
| 2847714 | 5/1980 | Fed. Rep. of Germany | 55/59 |
| 3316062 | 11/1984 | Fed. Rep. of Germany | 55/59 |
| 1-139124 | 5/1989 | Japan | 55/59 |

*Primary Examiner*—Robert Spitzer
*Attorney, Agent, or Firm*—Reed Smith Haw & McClay

[57] ABSTRACT

An environmentally-safe system and process for recovering solvents and disposing of contaminants released by regeneration of one or more solvent-laden air (SLA) adsorbers. The process begins with regeneration of the carbon in the adsorbers with low-pressure steam, and condensation/cooling of the resulting steam and reclaimed solvent/contaminant mixture. The mixture flows by gravity to a decanter for separation into two layers. From the decanter, the upper solvent-plus-contaminant layer flows to intermediate storage prior to further purification in a liquid extraction unit. The lower water-plus-contaminant layer flows to a water layer tank for further purification in a combined stripping and rectification system and, finally, either to the sewer or to an optional steam regeneration unit. The contaminants released by stripping and rectification are concentrated and then cleanly and essentially completely incinerated in a thermal oxidation system to produce environmentally safe incineration exhaust gases.

6 Claims, 2 Drawing Sheets

SYSTEM FOR RECOVERING SOLVENTS AND DISPOSING OF CONTAMINANTS RELEASED BY REGENERATION OF SOLVENT LADEN AIR ADSORBER VESSELS

FIELD OF THE INVENTION

The present invention relates generally to air purification processes and more particularly to systems for recovering solvents and disposing of contaminants released by regeneration of solvent-laden air (SLA) adsorber vessels.

BACKGROUND OF THE INVENTION

Solvents (and contaminants) are commonly removed from an SLA stream occurring, for example, as a result of industrial coating processes, through contact with an adsorbent such as activated carbon. When the adsorbent becomes saturated or nearly saturated with solvent, the adsorbent is regenerated using steam to heat up the adsorbent and displace the solvents and contaminants. The steam, solvents and contaminants leave the adsorber and are condensed. Two layers form if the solvents are insoluble in water. In this case, the solvents may be separated from the water by decantation. If the solvents are soluble in water, there will not be any separation, and the solvents must be separated from water by other means such as distillation.

Regeneration processes typically require that the water layer from decantation be further treated by air stripping or steam stripping to remove the dissolved solvents and other contaminants which remain in the water layer before the water is discharged to the sewer. In fact, government standards require the removal of dissolved solvents and contaminants from these effluent water streams prior to sewering these streams. Removal of solvents and contaminants from water exiting regeneration processes to an environmentally safe level where the water may be discharged to the sewer is both technically demanding and expensive. Treatment is particularly difficult and costly when the solvents and contaminants are soluble in water. In many such processes, a single air or stream stripping treatment is incapable of removing solvents and contaminants in quantities sufficient to permit the water to be safely discharged into the sewer.

U.S. Pat. No. 4,689,054 discloses a system wherein contaminant rich liquid phase functions from the stripping treatment are routed to an incinerator where they are consumed as fuel. A major disadvantage of direct incineration of liquid phase contaminants, however, is that expensive and difficult to attain licensing or permission is required before the liquid phase contaminants, which are viewed as hazardous waste, can be incinerated.

A need exists, therefore, for an environmentally safe solvent recovery system which is capable, in a single integrated treatment, of: 1) removing solvents and contaminants in quantities sufficient to permit water extracted from steam/solvent/contaminant mixtures obtained from regeneration of SLA adsorber vessels to be safely discharged into a sewer, 2) recovering the solvents in virtually pure form, and 3) disposing of the contaminants by an essentially non-polluting thermal oxidation procedure.

SUMMARY OF THE INVENTION

In accordance with the present invention, there is provided a process for recovering solvents and disposing of contaminants released by regeneration of one or more SLA adsorber vessels adsorbers. Briefly, the process employed in the removal and recovery of the solvent and disposal of the contaminants begins with the efficient adsorption of solvent vapors and contaminants contained in the solvent-laden air stream by the activated carbon in the adsorber(s), followed by periodic regeneration of the carbon in the adsorbers with low-pressure steam, and condensation/cooling of the resulting steam and reclaimed solvent/contaminant mixture. The condensed mixture of the solvents/contaminants and condensate from the process condenser/cooler flows by gravity to a decanter for separation into layers. From the decanter, the upper solvent-plus-contaminant layer flows to intermediate storage prior to further purification in a liquid extraction unit. The lower water-plus-contaminant layer flows to a water layer tank for further purification in a combined stripping and rectification distillation system and, finally, either to the sewer or, by suitable valve control, to an optional steam regeneration unit.

Solvent-laden air (SLA) emissions from industrial coating operations typically range, depending on the coating conditions and compositions, from about 200° F. to about 300° F. The emissions are normally drawn into SLA preconditioning systems, usually consisting of an SLA cooler and filter. In instances where the SLA may have high relative humidity, there may also be provided a subcooling/condensation means, such as a chilled water coil for cooling the SLA to approximately 80° F. The resulting condensate then flows to a condensate recovery. The SLA may then be reheated to approximately 90° F. in a steam heated coil. From the preconditioning system, the SLA is drawn into the suction of one or more motor-driven SLA blowers. During initial operation, one blower will normally operate and one blower will be an installed spare. Additional blowers can be added as desired. The SLA blowers are equipped with automatic inlet guide vane dampers (operated under pressure control) for air volume control. The blowers are designed to develop sufficient static pressure to insure the flow of the SLA through the various components of the system, including negative suction allowance for extraction of the SLA through the inlet ducting, i.e., SLA ducting and/or branches from emissions/sources to the site.

During automatic operation, the SLA flow from the SLA blower is normally distributed through at least one adsorber vessel containing free-breathing carbon wherein the solvents and contaminants are adsorbed/retained.

The exhaust air from the adsorber vessels, stripped of solvents and contaminants is discharged through an air outlet valve and an exhaust stack to the atmosphere. Normally, if more than one adsorber is employed, a panel-mounted programmable cycle controller, together with field-mounted solenoids and accessories, will automatically divert the flow of solvent-laden air from one adsorber to the other, as soon as the predetermined maximum adsorption cycle times are completed or when an independent exhaust analyzer/breakthrough controller for the system overrides the programmed controller and dictates a cycle change based upon a predetermined allowable solvent concentration in the exhausted stripped air stream.

After an adsorption cycle has been completed and/or terminated for a given adsorber, regeneration of the activated carbon in the adsorber is initiated by the closing of the SLA inlet/stripped air outlet valves and then opening of the vapor outlet valve to the adsorber. The solvents and contaminants retained by the activated carbon are then steam-stripped by distribution of low pressure steam through the carbon. The frequency of regeneration, the quantity of steam flow/consumption and the duration of the steaming period is automatically adjusted depending upon SLA flow volume and/or the quantity of solvents and contaminants contained in the SLA and retained by the carbon.

During the first minutes of steaming of each regeneration cycle, most of the latent heat in the steam supply is utilized in heating the adsorber vessel internals and activated carbon charge to the proper equilibrium desorption temperature levels. During this initial period of the regeneration cycle, steam condensate formed within the adsorber will exit through drain piping located at the bottom of the vessel being steamed and flow to a condensate tank. The condensate is then transferred to a process condenser/cooler. The quantity of condensate formed and its duration of flow will vary depending upon adsorber temperature, conditions at the start of regeneration, and prevailing process conditions.

During winter months, the quantity of steam consumed in preheating the adsorber and the quantity of condensate produced will be somewhat greater than during an equivalent summer period.

After the adsorber undergoing regeneration has reached its equilibrium desorption status, a flow of steam and solvent/contaminant vapors into a process shell and tube condenser/cooler is established. The condenser/cooler is designed to remove the latent heat of all vapors.

Regeneration of an adsorber may continue for the maximum period of time programmed in a preset control logic of the system or may be terminated by steam economy control logic. In either case, when the steaming cycle time has been terminated, the SLA inlet, stripped air outlet, vapor outlet and steam inlet valves will change over, automatically, so that the adsorber which has just been steamed goes through a separate cooling cycle in which ambient or tempered air is passed through the adsorber by a cooling blower. Following the cooling cycle, the adsorber goes into "standby" while the next adsorber becomes available for its "regeneration" cycle. The condensed steam/solvent/contaminant mixture from the condenser/cooler then flows to a decanter where two layers are normally formed. The upper (solvent-plus-contaminant) layer and the lower (water-plus-contaminant) layer are then separated and processed as needed to recover the solvent and dispose of the contaminants.

The solvent recovery and contaminant disposal system of the present invention processes the upper and lower layers by an integrated treatment whereby sufficient quantities of contaminants are removed such that the recovered solvent is essentially pure and the water may be safely discharged into the sewer. Moreover, the removed contaminants are disposed of, while in the vapor phase, by an essentially non-polluting thermal oxidation procedure.

More particularly, the present invention involves the removal of alcohols, ketones, esters, or any water-soluble solvents, tert-butanol, isopropyl alcohol, along with other water soluble contaminants, from recovered solvents including, inter alia, heptane and/or a heptane/toluene blend, by means of liquid/liquid extraction with decontaminated process water. The extraction of contaminants from the process water includes steam stripping and rectification of the decanter water layer and the solvent recovery extraction water to remove and concentrate the alcohol (and other contaminant) portion of the recovered solvents, followed by venting of the alcohol distillate and associated contaminant vapors to a vapor phase thermal oxidation unit for essentially non-polluting destruction of the alcohols and other water soluble contaminants. As a result of the incineration of the contaminants while in the vapor phase, an operator using the present system can cleanly dispose of the contaminants without normally having to procure the level of hazardous waste disposal licensing or permission that is required of liquid phase contaminant disposal.

Other details and advantages of the present invention will become apparent as the following description of the presently preferred embodiment and presently preferred methods of practicing the invention proceeds.

BRIEF DESCRIPTION OF THE DRAWING

The invention will become more readily apparent from the following description of a preferred embodiment thereof shown, by way of example only, in the accompanying drawing, where.

DETAILED DESCRIPTION OF THE INVENTION

Figure 1A:
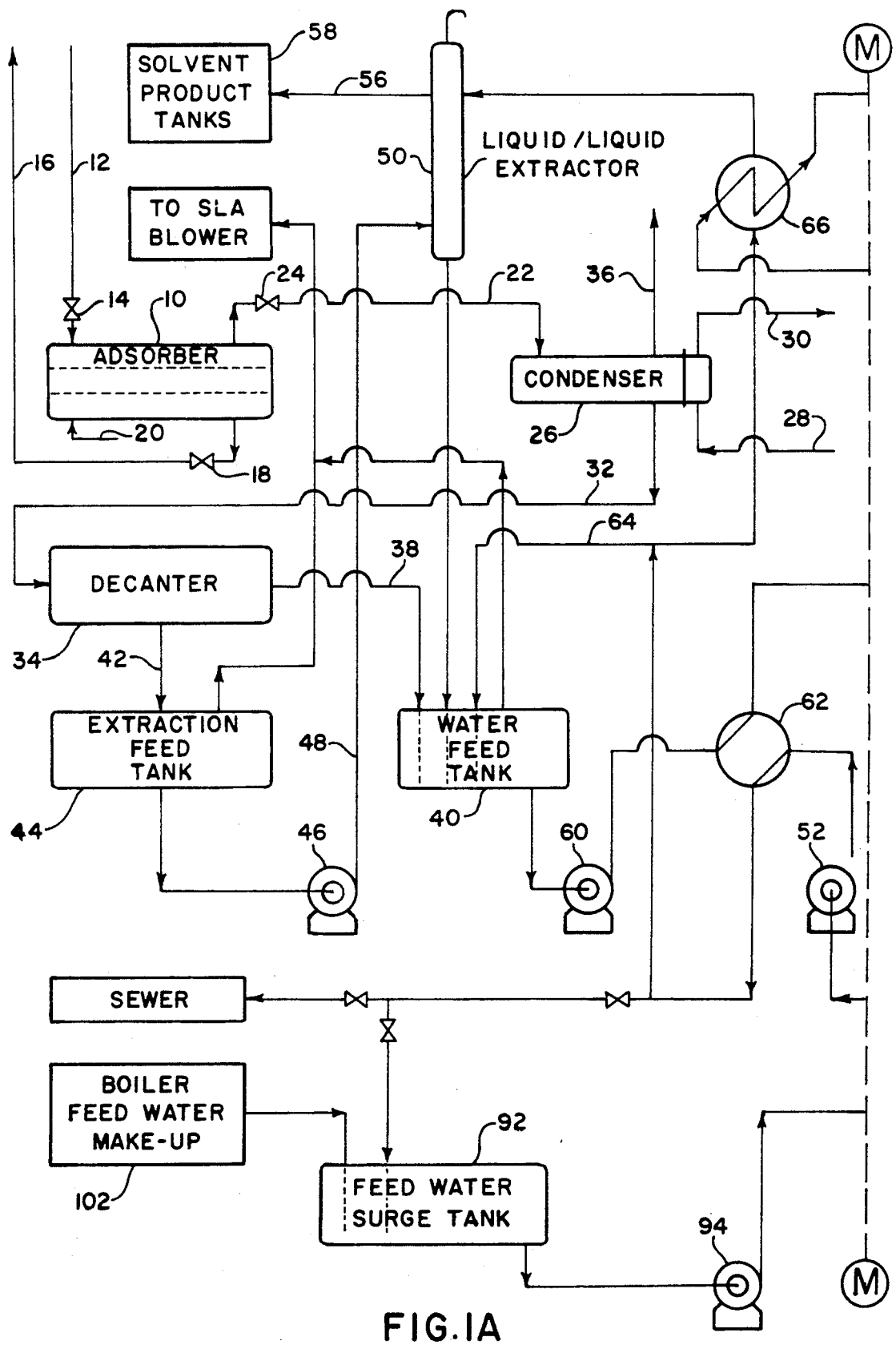
Figs. 1A and 1B illustrate a schematic diagram of a presently preferred embodiment of an SLA solvent recovery and contaminant disposal system in accordance with the present invention.
Figure 1B:
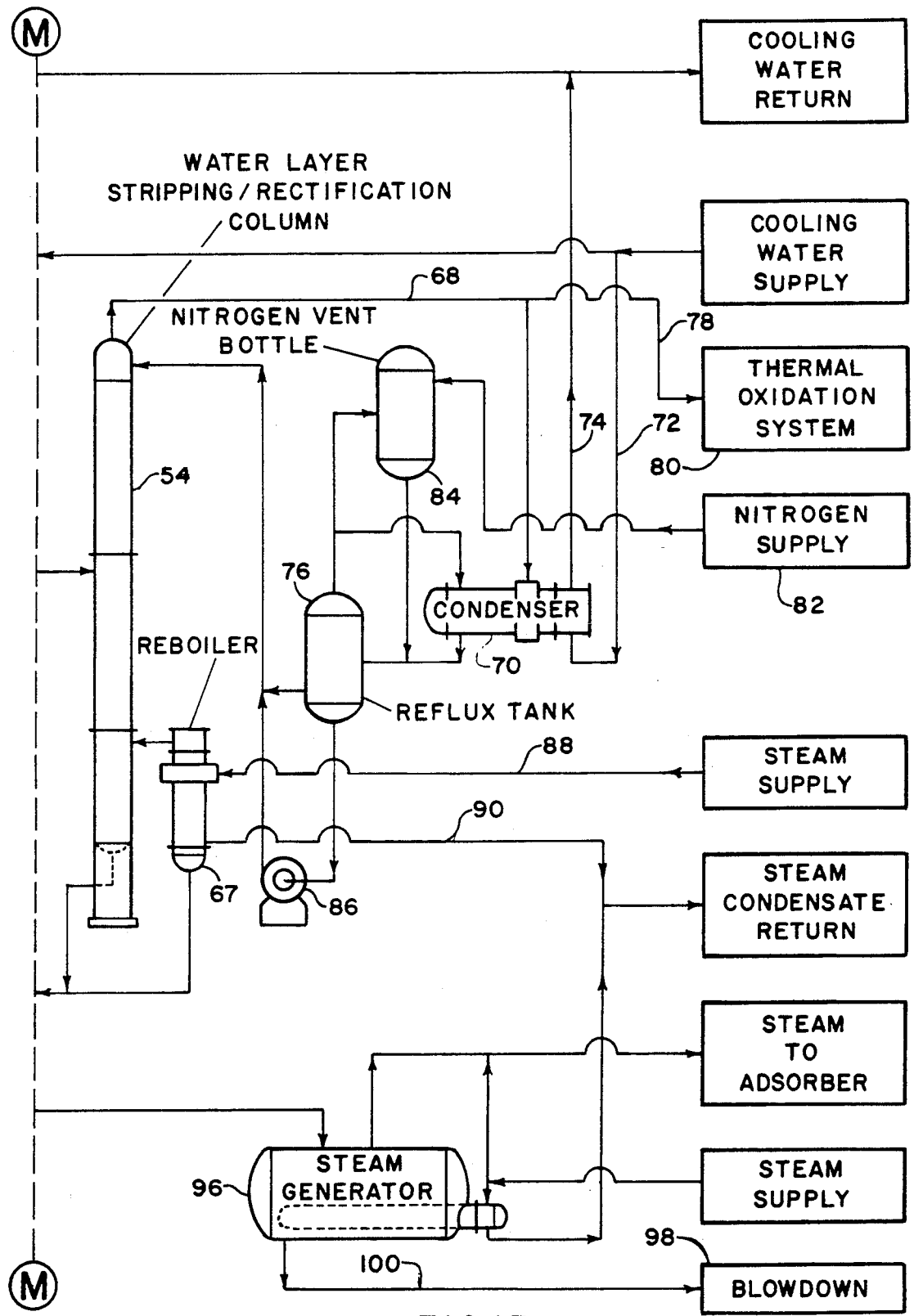

There is shown schematically in Figs. 1A and 1B, which are joined by a matchline M—M, a presently preferred system and process according to the invention. In operation, solvent-laden air (SLA) enters an adsorber, herein designated by reference numeral 10, through an SLA inlet path 12. The flow of inlet SLA is controlled by an SLA inlet valve 14. In the adsorber 10, the SLA is passed through an adsorbent, preferably a bed of activated carbon. Solvents and contaminants in the SLA stream are adsorbed by the adsorbent and purified air leaves the adsorber 10 through an air exit path 16 controlled by a valve 18. The purified air can usually be vented to the atmosphere without further treatment.

When the adsorbent becomes saturated with solvents and contaminants, the adsorbent is regenerated. The adsorbent is preferably regenerated when desorption equilibrium is attained or nearly attained, or when environmental limits of solvent and contaminant particles are reached in the air leaving the adsorber.

The process of the invention preferably provides for essentially closed loop regeneration of the adsorbent. The regenerating gas, steam, is passed to the adsorber 10 through a valve-controlled steam inlet path 20 to strip solvents and contaminants from the adsorbent. The steam and solvent vapors are transported from the adsorber 10 by an adsorber steam exit path 22, which is controlled by a steam exit valve 24. The steam and solvent vapors exiting the adsorber are preferably between 200° F. and about 230° F.

The steam and solvent vapors exiting the adsorber 10 are passed to a condenser 26. The condenser 26 is supplied with cooling means such as water which enters the condenser by a condenser water inlet path 28 and exits the condenser by a condenser water outlet path 30. The temperature of the cooling water that is required depends on process parameters, and particularly on the solvents being condensed. Condensed water, solvents and contaminants exit the bottom of the condenser through a condenser liquid exit path 32 and are transported to a decanter 34. Non-condensables leave the condenser 26 through a condenser vapor exist path 36, which preferably returns the non-condensables to another adsorber for adsorption. The temperature of the fluids leaving the condenser 26 will depend on the particular solvents being removed and other process parameters.

The decanter 34 separates the liquid product from the condenser into a solvent-rich fraction and a water layer fraction. The water layer fraction may, for example, form at the bottom of the decanter 34 and exit through a heavy fraction exit path 38 to a water layer tank 40. The solvent-rich fraction, which forms at the top of the decanter 34, leaves the top of the decanter 34 through a decanter light fraction exit path 42 and is passed to an extraction feed tank 44.

If, for example, the discharge from an industrial coating process is being purified by the system of the present invention, the solvents that are recovered from the upper fraction of the decanter 34 may include heptane, a heptane/toluene blend, or the like. Other solvents which are miscible in water and recoverable in accordance with the present invention may also include, inter alia, ethanol, propanol and tetrahydrofuran. The solvent-rich upper fraction of the decanter 34 which is passed to the extraction feed tank 44 also normally contains contaminants such as, for example, alcohols and acetates.

The recovered solvents and contaminants in the extraction feed tank 44 are continuously pumped by pump 46 through line 48 to the base section of a liquid/liquid extraction column 50.

The recovered solvent and any contaminants it may contain flow upwardly through the extraction column 50 countercurrent to downwardly flowing cooled process water pumped by a pump 52 from the base of a water layer stripping/rectification column 54, the function of which will be described in greater detail hereinbelow. The dissolved alcohols, acetates, or the like, are extracted in extraction column 50 from the recovered solvent, and the resulting water and contaminant mixture flows from the bottom of the liquid/liquid extraction column 50 to the water layer tank 40. The recovered solvent, now essentially contaminant-free, flows through line 56 to one or more intermediate solvent product storage tanks 58 while the water layer from the decanter 34 is combined in the water layer tank 40 with the extraction water, i.e., the water and contaminant mixture from the liquid/liquid extraction column 50.

From the water layer tank 40 the combined water phase mixture which typically contains alcohols (e.g., isopropyl alcohol, tert-butanol) or acetates (e.g., ethyl acetates) or combinations thereof, trace quantities of other water soluble impurities, and small fractions of dissolved solvents, is pumped under flow control by pump 60 through heat exchanger 62 as feed to the water layer stripping/rectification column 54.

The water layer stripping/rectification column 54 is operated at an elevated pressure, preferably from about 10 to 14 PSIG. In column 54, the alcohols (and/or acetates) and other contaminants, along with dissolved solvent, are stripped from the feed water mixture as the water flows down the column 54 by countercurrent contact with heated vapor (steam) rising up through the column 54.

A portion of the stripped water effluent from the base of the column 54 is then cooled in heat exchanger 62 by preheating the incoming feed water mixture that is pumped into the water layer stripping/rectification column 54 from water layer tank 40. A fraction of this stripped and cooled effluent water from column 54 is preferably diverted into water layer tank 40 via line 64. Yet another fraction of the stripped and cooled effluent is further cooled in a second heat exchanger 66 and utilized as the extraction water for the liquid/liquid extractor 50. The balance of the cooled stripping/rectification column effluent water may be pumped to the sewer or to an optional steam regeneration system to be described in detail hereinafter. Moreover, an uncooled portion of the stripped effluent water from column 54 is preferably reheated in a steam operated reboiler 67 and recycled back into the lower region or stripping section of column 54 to serve as the steam for stripping the incoming feed water mixture from water layer tank 40.

In the upper region or rectifying section of the water layer stripping/rectification column 54 the alcohols, acetates, traces of dissolved solvents and other contaminants are concentrated by rectification into highly volatile and clean burning vapors having approximate azeotrope concentrations of 80 to 85 wt.% alcohols. The overhead vapor exiting from the top of the column 54 flows through line 68 to the partial vapor condenser 70 whereat a portion of the vapor is condensed to the liquid state utilizing cooling water circulating through the condenser 70 via condenser water inlet line 72 and condenser water outlet line 74. The liquid condensate from the condenser 70 then flows by gravity to a condensate receiver tank or reflux tank 76.

The remainder of the overhead vapor exiting column 54, such vapor consisting of the net input of alcohols and other water soluble solvents, is vented by a vapor line 78 at a pressure of 10 to 12 PSIG under temperature/flow control to a vapor phase thermal oxidation system or incinerator 80. The high azeotropic concentrations of alcohol in the contaminant vapors combusted in the incinerator 80 virtually assures that the contaminants will be cleanly and completely combusted in the incinerator to result in environmentally safe incineration exhaust gases. The pressure in the column 54 is maintained and controlled by the introduction of substantially inert nitrogen ($N_2$) gas from a nitrogen gas supply 82 to vent bottle 84. A portion of the nitrogen, approximately 25 to 50 standard cubic feet per hour (SCFH) per system, along with the alcohol vapors, is also vented to the thermal oxidation system 80. The nitrogen is required in order to maintain water layer stripping/rectification column 54 pressure control and as a carrier gas to provide some partial pressure to the system so that the Ideal Gas Law is satisfied and condensation does not occur in the heat traced and insulated vent line 78. The combination of stripping and rectification in column 54 thus achieves the advantages of effective solvent recovery and contaminant disposal in a single integrated treatment.

From condensate receiver (reflux) tank 76 the liquid condensate is refluxed under level control via pump 86 to the top or water layer stripping/rectification column 54 in order to maintain the desired alcohol concentration profile throughout the column 54. As mentioned hereinabove, heat is supplied to the water layer stripping/rectification column 54 by introducing steam under flow control from the reboiler 67 located at the base section of the column 54. The feed water to reboiler 67 is a portion of the stripped water effluent discharged from the base of column 54. The steam for operating reboiler 67 is generated by heat which may be provided by electricity, high pressure steam, or the combustion of fuel. In the presently preferred embodiment, high pressure steam enters the reboiler 67 through a high pressure steam inlet path 88 and exits the reboiler through a high pressure steam exit path 90. The high pressure steam transfers heat to the feed water in the reboiler by partially condensing on the interiors of the heating tubes of the reboiler.

Also illustrated in FIG. 1 is a steam regeneration subsystem which, although optional, is preferably included as part of the Solvent Recovery/Emission Control/Contaminant Disposal system thus far described.

In the steam regeneration subsystem, a portion of the water effluent (bottoms) from the stripping/rectification column 54 flows to a feed water surge tank 92. The contents of the surge tank 92 are then pumped by pump 94 under level control to a steam generator 96.

Heat is supplied to the steam generator 96 by condensing, under pressure control, high pressure boiler steam from a high pressure steam supply 98. The recycled stripper/rectification column bottoms in the steam generator 96 are then vaporized thereby producing low pressure steam which is preferably utilized for regeneration of the carbon beds in adsorber(s) 10. Uncontaminated steam boiler condensate from the steam generator tube bundle is returned via high pressure stream exit path 90 to a steam condensate return leading to a high pressure steam generator (not illustrated).

With the inclusion of the steam regeneration subsystem, the present invention provides virtually complete internal recycle of steam condensate after layer stripping/rectification column bottoms and essentially eliminates solvent-containing liquid effluents except for periodic "blowdown" cleansing of the steam generator 96 through blowdown conduit 100. Also, any additional water which may be required for proper operation of the steam regeneration subsystem may be added to the feed water surge tank 92 through boiler feed water makeup 102.

The purpose of the optional steam regeneration subsystem is to reduce the volume of waste water effluent to the public waste water treatment system. By incorporation of the stream regeneration system into the Solvent Recovery/Emission Control/Contaminant Disposal process, the volume of waste water effluent from the carbon adsorber regeneration cycle is reduced approximately 98%.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for recovering solvents and disposing of contaminants released by regeneration of solvent-laden air (SLA) adsorbents, said process comprising the steps of:
    (a) passing steam through the adsorbents to desorb solvents and contaminants from the adsorbents;
    (b) condensing the steam, solvents and contaminants exiting the adsorbent to produce a condensate;
    (c) separating the condensate into at least one solvent-rich fraction having contaminants and a water fraction having contaminants;
    (d) stripping the water fraction to produce a substantially pure liquid water phase and a contaminant-bearing vapor phase;
    (e) rectifying the contaminant-bearing vapor phase to concentrate the contaminants in the contaminant-bearing vapor phase; and
    (f) incinerating a quantity of the concentrated contaminant-bearing vapor phase.

2. The process of claim 1 further comprising, concurrently with step (f), recycling unincinerated quantities of the concentrated contaminant-bearing vapor phase in order to perform the rectifying step (e).

3. The process of claim 1 further comprising the step of introducing substantially inert gas into a stripping/rectification column within which the stripping step (e) and the rectifying step (f) are performed in order to control pressure in the stripping/rectification column.

4. The process of claim 1 further comprising the step of extracting contaminants from the solvent-rich fraction using a quantity of the substantially pure liquid water phase produced in stripping step (d).

5. The process of claim 1 further comprising the step of producing steam for use in desorption step (a) from a quantity of the substantially pure liquid water phase produced in stripping step (d).

6. The process of claim 1 further comprising the step of producing steam for use in stripping step (d) from a quantity of the substantially pure liquid water phase produced in stripping step (d).

* * * * *